United States Patent
Singh

(10) Patent No.: US 8,078,638 B2
(45) Date of Patent: *Dec. 13, 2011

(54) OPERATIONS OF MULTI-LEVEL NESTED DATA STRUCTURE

(75) Inventor: Vikash Singh, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 406 days.

This patent is subject to a terminal disclaimer.

(21) Appl. No.: 12/169,931

(22) Filed: Jul. 9, 2008

(65) Prior Publication Data

US 2010/0010960 A1    Jan. 14, 2010

(51) Int. Cl.
*G06F 17/30* (2006.01)

(52) U.S. Cl. ........ 707/791; 707/802; 707/803; 707/809; 707/810; 707/811

(58) Field of Classification Search .................. 707/791, 707/802, 803, 809, 810, 811
See application file for complete search history.

(56) References Cited

U.S. PATENT DOCUMENTS

| | | | | |
|---|---|---|---|---|
| 5,469,568 A * | 11/1995 | Schiefer et al. | ............ | 1/1 |
| 7,171,398 B2 * | 1/2007 | Bestgen et al. | ............ | 1/1 |
| 2003/0046257 A1 * | 3/2003 | Atkin | ............ | 707/1 |
| 2005/0086208 A1 * | 4/2005 | Bestgen et al. | ............ | 707/3 |
| 2006/0069545 A1 * | 3/2006 | Wu et al. | ............ | 704/8 |
| 2008/0016045 A1 * | 1/2008 | Breining et al. | ............ | 707/3 |
| 2009/0077050 A1 * | 3/2009 | Breining et al. | ............ | 707/4 |
| 2009/0193006 A1 * | 7/2009 | Herrnstadt | ............ | 707/5 |
| 2010/0205171 A1 * | 8/2010 | Shmueli et al. | ............ | 707/714 |

OTHER PUBLICATIONS

U.S. Patent Application File History for U.S. Appl. No. 12/041,054, filed Mar. 3, 2008.
U.S. Patent Application File History for U.S. Appl. No. 12/041,062, filed Mar. 3, 2008.
U.S. Patent Application File History for U.S. Appl. No. 12/041,088, filed Mar. 3, 2008.
U.S. Patent Application File History for U.S. Appl. No. 12/170,025, filed Jul. 9, 2008.
U.S. Patent Application File History for U.S. Appl. No. 12/180,486, filed Jul. 25, 2008.
U.S. Patent Application File History for U.S. Appl. No. 12/180,499, filed Jul. 25, 2008.

* cited by examiner

*Primary Examiner* — Frantz Coby
(74) *Attorney, Agent, or Firm* — SNR Denton US LLP

(57) ABSTRACT

Multiple sets of data are obtained from different sources. Each data set is represented using a different format having a different syntax and organized in a multi-level nested data structure. Each data set is reformatted into a standardized table format using a depth-first recursive algorithm without relying on the syntax schema of the original format of the data set. Various operations are performed on the tables corresponding to the data sets, including but not limited to joining multiple tables, grouping selected rows of a table, ranking rows of a table, adding or deleting fields from selected rows of a table, etc. Optionally, inferred namespace and text normalization are utilized for selected table operations. One or more templates are provided for converting the data set of a table to a format that may be presented to a user.

17 Claims, 4 Drawing Sheets

OPERATIONS OF MULTI-LEVEL NESTED DATA STRUCTURE

TECHNICAL FILED

The present invention generally relates to reformatting, combining, manipulating, and presenting multiple data sets where each data set is organized and represented using a multi-level nested data structure.

BACKGROUND

In the modern digital age, there is a vast amount of data publicly available stored in various types of data-stores or databases around the world. A person may retrieve desired portions of the data using various methods. A very convenient and widely employed method is through the Internet via either wired or wireless connections and using appropriate communication protocols. Alternatively, portions of data maybe retrieved from data-stores or databases directly using suitable query languages.

In such a distributed system where information is stored at many different locations, it is not unusual that information relating to a single subject matter may be stored at multiple locations. For example, suppose a person is interested in a particular political candidate in the upcoming election and wants to learn all he can about the candidate in order to make an informed decision on whether or not to vote for her in the election. There are many sources from where the person may obtain information about the candidate. Background information about the candidate or the candidate's political views and positions may be found at websites sponsored by the candidate's political party or supporters or informational websites (e.g., wikipedia). News stories about the candidate may be found at news agencies' websites (e.g., CNN or The New York Times) or via live news feeds (e.g. Yahoo!® News or Google™ News). Private discussions or posts about the candidate may be found in different news groups or at different blog sites. Images or videos of the candidate may be found at image or video sharing websites (e.g. Flickr™, YouTube™, or Digg™). As a result, in order to obtain a comprehensive collection of information about the candidate, the person often needs to visit many different sources (i.e., websites, news groups, live feeds, blogs, etc.).

It would be more convenient and helpful if a single centralized service existed that would retrieve information about a particular subject matter (e.g., the political candidate) from multiple sources, combine the results, organize the information in a suitable fashion, and present the complete final results to the person. Unfortunately, combining and processing data obtained from different sources may be difficult at times because there are many different formats that may be used to represent a set of data, and often, each format has very different syntaxes. Consequently, multiple data sets having different formats cannot be combined readily because of the conflicts in their respective syntaxes.

SUMMARY

Broadly speaking, the present invention generally relates to reformatting, combining, manipulating, and presenting multiple data sets where each data set is organized and represented using a multi-level nested data structure. More specifically, the present invention relates to reformatting data sets organized in multi-level nested data structures into corresponding tables without relying on the syntax schemas of the original formats of the data sets, performing various operations on one or more tables corresponding to the data sets, and providing templates for presenting one or more tables to a user.

According to various embodiments, multiple data streams, each containing a set of data, are obtained from different sources. The data streams use different data formats having different syntaxes to represent the data sets. Conceptually, each data set contains multiple name-value pairs organized in a multi-level nested structure.

The data sets are reformatted into a standardized table format, such that each data set corresponds to a single table having at least one row and each row having at least one field. The reformatting does not require the syntax schema of any data set, but determines the proper entry in the table for a specific name-value pair in the data stream based on the location of the name-value pair within the multi-level nested structure. Specifically, if a name-value pair is located at two levels outside the innermost level, the name-value pair corresponds to a table. If a name-value pair is located at one level outside the innermost level, the name-value pair corresponds to a row in the table corresponding to its parent name-value pair. If a name-value pair is located at the innermost level, the name-value pair corresponds to a field in the row corresponding to its parent name-value pair in the table corresponding to its grandparent name-value pair. If a data set results in multiple tables, then the table corresponding to the name-value pair that has the largest size of data nested within it is selected as the table for the entire data set.

Various operations may then be performed on the tables corresponding to the data sets. For example, two or more input tables may be joined together to obtain a single output table according to a join predicate. Rows from the input tables that satisfy the join predicate are combined to form rows in the output table. Two or more rows in a table may be grouped together into a single row according to a group predicate. Rows in a table may be ranked according to a rank predicate. Other table operations may include adding fields to all or selected rows of a table, removing fields from all or selected rows of a table, selecting rows that satisfy a predicate from a table, etc.

During table operations, namespace qualifiers are automatically added or removed from field names when needed based on an inferred namespace scheme. For example, when joining two or more tables, if two or more rows that are to be combined have the same field, the field names are automatically further qualified with their respective table names. When performing word search or word matching, the namespace qualifiers added to field names are ignored.

A set of templates are provided for presenting the tables. The templates comply with various computer language syntax requirements or specification. A data set represented by a table may be converted back into a data stream in a computer readable format to be presented to the users.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
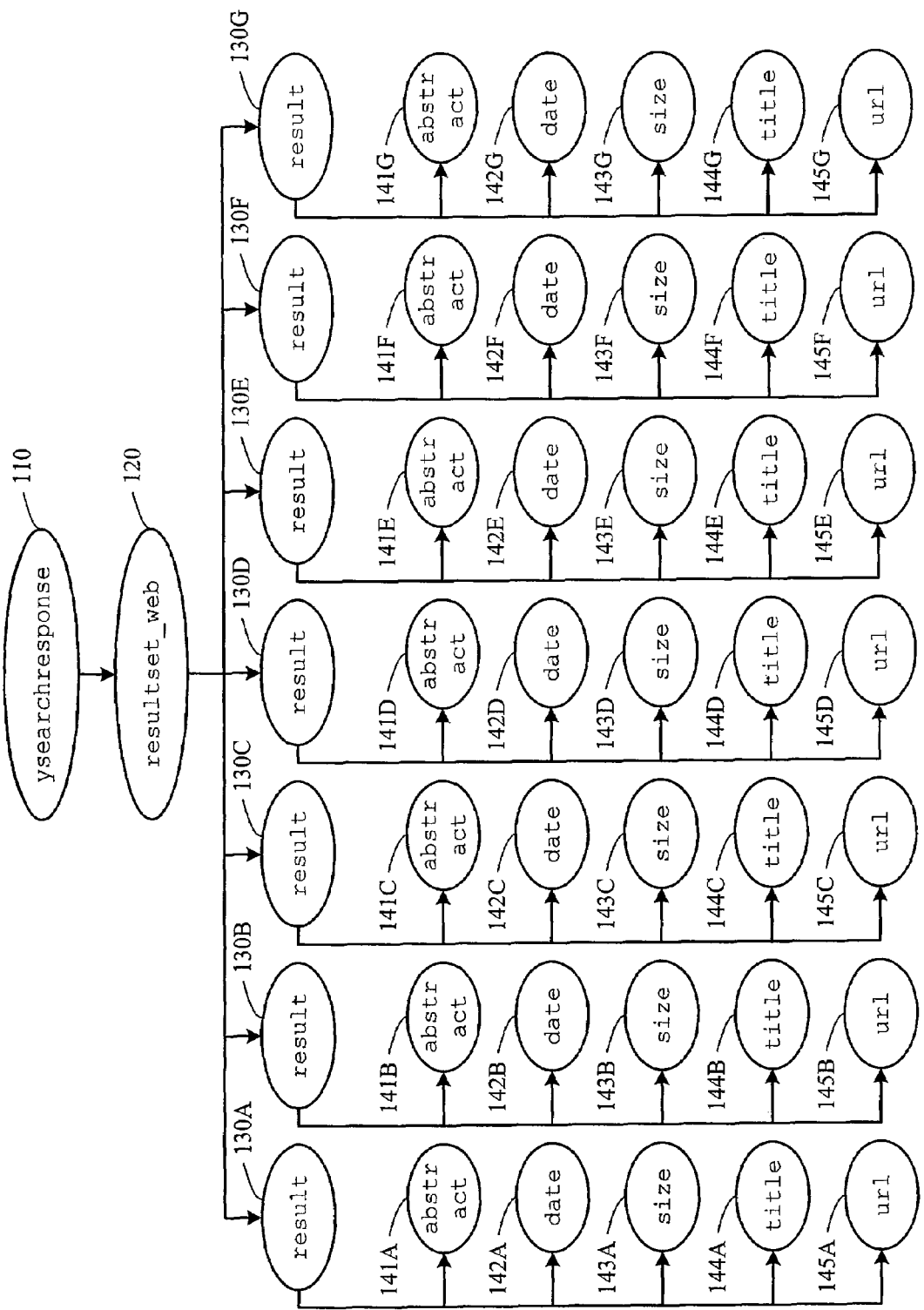
FIG. 1 illustrates a hierarchical tree structure that may be used to represent a multi-level nested data structure conceptually.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that this description is not intended to limit the invention to the described embodiments. To the contrary, the description is intended to cover alternatives, modifications, and equivalents as may be included within the spirit and scope of the invention as defined by the appended claims.

I. Overview

Data obtained from different sources may be represented in various formats, and sometimes one format may differ greatly in syntax from another format. Syntax may refer to the code structure or definition, language specification, etc. It would be difficult to process multiple sets of data (e.g., combining them), each represented using a different format, because each format usually has its own unique syntax specification that requires a correspondingly suitable parsing scheme. One way to address this problem is to first reformat all the relevant data sets represented in different formats into a standard format. Once the multiple data sets all have the same standard format, they may then be combined and further manipulated or processed.

According to various embodiments, multiple data sets obtained from different sources and represented using different formats having different syntaxes are reformatted into a standardized table format. Thereafter, various operations may be performed on the tables. For example, two or more tables may be joined together to obtain a single table according to a set of criteria. Selected rows in a table may be grouped together according to another set of criteria. Rows in a table may be ranked, and so on. One or more templates may be provided to convert a table back to a data stream that complies with a computer language specification for presentation to the users.

II. Reformat Data Stream

A set of data may be converted from one format to another format. According to one embodiment, a data set represented in any format that complies with the XML or JSON syntax specification may be automatically and intelligently reformatted into a table.

The Extensible Markup Language (XML) is a simple and flexible general-purpose text format for creating markup languages. It is widely used in connection with Internet applications, especially on the World Wide Web. A set of data represented using the XML format should meet the XML syntax requirements. The following is a sample data set represented using XML. The data set relates to information about various services provided by Yahoo!® Inc.

```
Sample Code 1: XML Code

<ysearchresponse>
    
        <result>
            <abstract>Yahoo Mail provides free,
customizable email, including PhotoMail online picture sharing,
spam protection, filtering, and multiple email account
management.</abstract>
            <date>2008/06/27</date>
            <size>25026</size>
            <title>Yahoo! Mail</title>
            <url>http://mail.yahoo.com/</url>
        </result>
        <result>
            <abstract>Yahoo! Search helps users find
information, news, images, video, products, local services,
and answers from around the Web. </abstract>
            <date>2008/06/27</date>
            <size>6400</size>
            <title>Yahoo! Search</title>
            <url>http://search.yahoo.com/</url>
        </result>
        <result>
            <abstract>... radio, music downloads and all
the latest music news and information on <b>Yahoo</b>! Music
<b>...</b> <b>Yahoo</b>! Music. You must have javascript
enabled for this site to...</abstract>
<date>2008/06/26</date>
            <size>60791</size>
            <title>Yahoo! Music</title>
            <url>http://new.music.yahoo.com/</url>
        </result>
        <result>
            <abstract>Yahoo! Maps features online mapping,
driving directions, and traffic. Get interactive city maps
with point-to-point directions and traffic updates. Explore
city <b>...</b> </abstract>
            <date>2008/05/06</date>
            <size>4229</size>
            <title>Yahoo! Maps</title>
            <url>http://maps.yahoo.com/</url>
        </result>
        <result>
            <abstract>A place where people ask each other
questions on any topic, and get answers by sharing facts,
opinions, and personal experiences.</abstract>
            <date>2008/06/27</date>
            <size>61354</size>
            <title>Yahoo! Answers</title>
            <url>http://answers.yahoo.com/</url>
        </result>
        <result>
            <abstract>Download Yahoo! Messenger to chat
with friends for free plus enjoy stealth settings, PC calls,
file sharing, photo sharing, streaming radio, and more. A
web...</abstract>
            <date>2008/06/27</date>
            <size>7117</size>
            <title>Yahoo! Messenger</title>
            <url>http://messenger.yahoo.com/</url>
        </result>
        <result>
            <abstract>Yahoo! Groups allows you to create
and manage online email communities in areas such as
Recreation and Sports, Entertainment and Arts, Hobbies and
Crafts, ...</abstract>
            <date>2008/06/27</date>
            <size>12471</size>
            <title>Yahoo! Groups</title>
            <url>http://groups.yahoo.com/</url>
        </result>
    
</ysearchresponse>
```

The above Sample Code 1 is a result in response to a web search request, enclosed within a pair of "<ysearchresponse> . . . </ysearchresponse>" tags. In XML context, the first tag in the pair (e.g., "<ysearchresponse>") is called a "start tag" and the second tag in the pair (e.g., "</ysearchresponse>") is called an "end tag". Enclosed within a pair of tags are some data associated with the tags. A pair of tags and the data enclosed within them together are called a "XML element".

The response includes seven results enclosed in a pair of " . . . " tags, and each result is enclosed in a separate pair of "<result> . . . </result>" tags. Within each result, there are five name-value pairs: abstract, date, size, title, and URL, and each name-value pair is represented using a separate XML element. The names correspond to the tags and the values correspond to the data enclosed in the tags.

JavaScript Object Notation (JSON) is a lightweight data-interchange format that is also widely used in connection with Internet applications. A set of data represented using JSON is built on multiple name-value pairs, similar to XML. An unordered set of name-value pairs is together referred to as an "object" and an ordered set of name-value pairs is together referred to as an "array". The following is the same sample data set as shown in Sample Code 1 above, but now represented using JSON.

Sample Code 2: JSON Code

{"ysearchresponse":{"resultset_web":[{"abstract":"Yahoo! Mail provides free, customizable email, including PhotoMail online picture sharing, spam protection, filtering, and multiple email account management.","date":"2008/06/27","size":"25026","title":"Yahoo ! Mail","url":"http://mail.yahoo.com/"},{"abstract":"Yahoo! Search helps users find information, news, images, video, products, local services, and answers from around the Web.","date":"2008/06/27","size":"6400","title":"Yahoo! Search","url":"http://search.yahoo.com/"},{"abstract":"... radio, music downloads and all the latest music news and information on Yahoo! Music ... Yahoo! Music. You must have javascript enabled for this site to ...","date":"2008/06/26","size":"60791","title":"Yahoo! Music","url":"http://new.music.yahoo.com/"},{"abstract":"Yahoo ! Maps features online mapping, driving directions, and traffic. Get interactive city maps with point-to-point directions and traffic updates. Explore city ...","date":"2008/05/06","size":"4229","title":"Yahoo! Maps","url":"http://maps.yahoo.com/"},{"abstract":"A place where people ask each other questions on any topic, and get answers by sharing facts, opinions, and personal experiences.","date":"2008/06/27","size":"61354","title":"Yahoo! Answers","url":"http://answers.yahoo.com/"},{"abstract":"Download Yahoo! Messenger to chat with friends for free plus enjoy stealth settings, PC calls, file sharing, photo sharing, streaming radio, and more. A web ...","date":"2008/06/27","size":"7117","title":"Yahoo! Messenger","url":"http://messenger.yahoo.com/"},{"abstract":"Yahoo ! Groups allows you to create and manage online email communities in areas such as Recreation and Sports, Entertainment and Arts, Hobbies and Crafts, ...","date":"2008/06/27","size":"12471","title":"Yahoo! Groups","url":"http://groups.yahoo.com/"}]}}

According to JSON syntax, an object begins with "{" and ends with "}". An array begins with "[" and ends with "]". A name is followed by a colon (":") and then its corresponding value, which may be a string, an object, or an array. One name-value pair is separated from another name-value pair by a comma (","). Similar to the XML sample code, in the JSON sample code, the top-level object is "ysearchresponse". The second-level object is "resultset_web", which includes an array of second objects corresponding to the second results. Each result object includes five name-value pairs corresponding to abstract, date, size, title, and URL respectively.

Data sets represented using XML or JSON are almost always hierarchical in nature (i.e., containing multiple nested levels), and a hierarchical data structure may be conceptually represented using a tree structure. FIG. 1 is a tree structure depicting the sample data set shown in Sample Code 1 and Sample Code 2. In FIG. 1, the root node, node 110, corresponds to the top- or outermost-level object "ysearchresponse". Root node 110 has one child node, node 120, which corresponds to the second-level object "resultset_web". Node 120 has seven child nodes, nodes 130(A-G), corresponding to the seven results. Each of the result nodes has five child nodes, nodes 141(A-G), 142(A-G), 143(A-G), 145 (A-G), and 145(A-G), corresponding to the name-value pairs abstract, date, size, title, and URL respectively and these are the leaf nodes of the tree since these nodes do not have any child node. Note that a name-value pair located at the innermost-level always corresponds to a leaf node in the tree structure.

A set of data represented using either XML or JSON or a hierarchical tree structure may be reformatted into a table-like data structure based on the positions of the nodes, such that a particular position in the tree structure corresponds to a particular entry in the table. The following Table 1 represents the data set shown in FIG. 1.

TABLE 1

A Reformatted Sample Data Set abstract="Yahoo Mail provides..."; date=2008/06/27; size=25026; title="Yahoo! Mail"; url=http://mail.yahoo.com
abstract="Yahoo Search helps..."; date=2008/06/27; size=6400; title="Yahoo! Search"; url=http://search.yahoo.com
abstract="... radio, music ..."; date=2008/06/26; size=60791; title="Yahoo! Music"; url=http://new.music.yahoo.com
abstract="Yahoo Maps features ..."; date=2008/05/08; size=4229; title="Yahoo! Maps"; url=http://maps.com
abstract="A place where people ..."; date=2008/06/27; size=61354; title=
"Yahoo! Answers"; url=http://answers.yahoo.com
abstract="Yahoo Messenger ..."; date=2008/06/27; size=7117; title="Yahoo! Messenger"; url=http://messenger.yahoo.com
abstract="Yahoo Groups ..."; date=2008/06/27; size=12471; title="Yahoo! Groups"; url=http://groups.yahoo.com Table 1 has seven rows corresponding to the seven result nodes, nodes 130(A-G). Each row has five fields corresponding to the five name-value pairs within each result (i.e., leaf nodes 141(A-G), 142(A-G), 143(A-G), 145(A-G), and 145 (A-G)). In other words, a leaf node in the tree (i.e., a name-value pair located at the innermost level) corresponds to a field in a particular row in the table, and a set of leaf nodes under the same parent node form a row of the table.

To automatically parse a data set organized in a multi-level nested structure and reformat the data into a table, according to one embodiment, a depth-first recursive algorithm may be used to find a collection of data objects where each data object includes one or more name-value pairs, referred to as "fields". To traverse a tree using the depth-first algorithm, one starts at the root node and traverses as far as possible along a branch (i.e., all the way to a leaf node) before backtracking up the tree to the next branch.

Figure 2A:
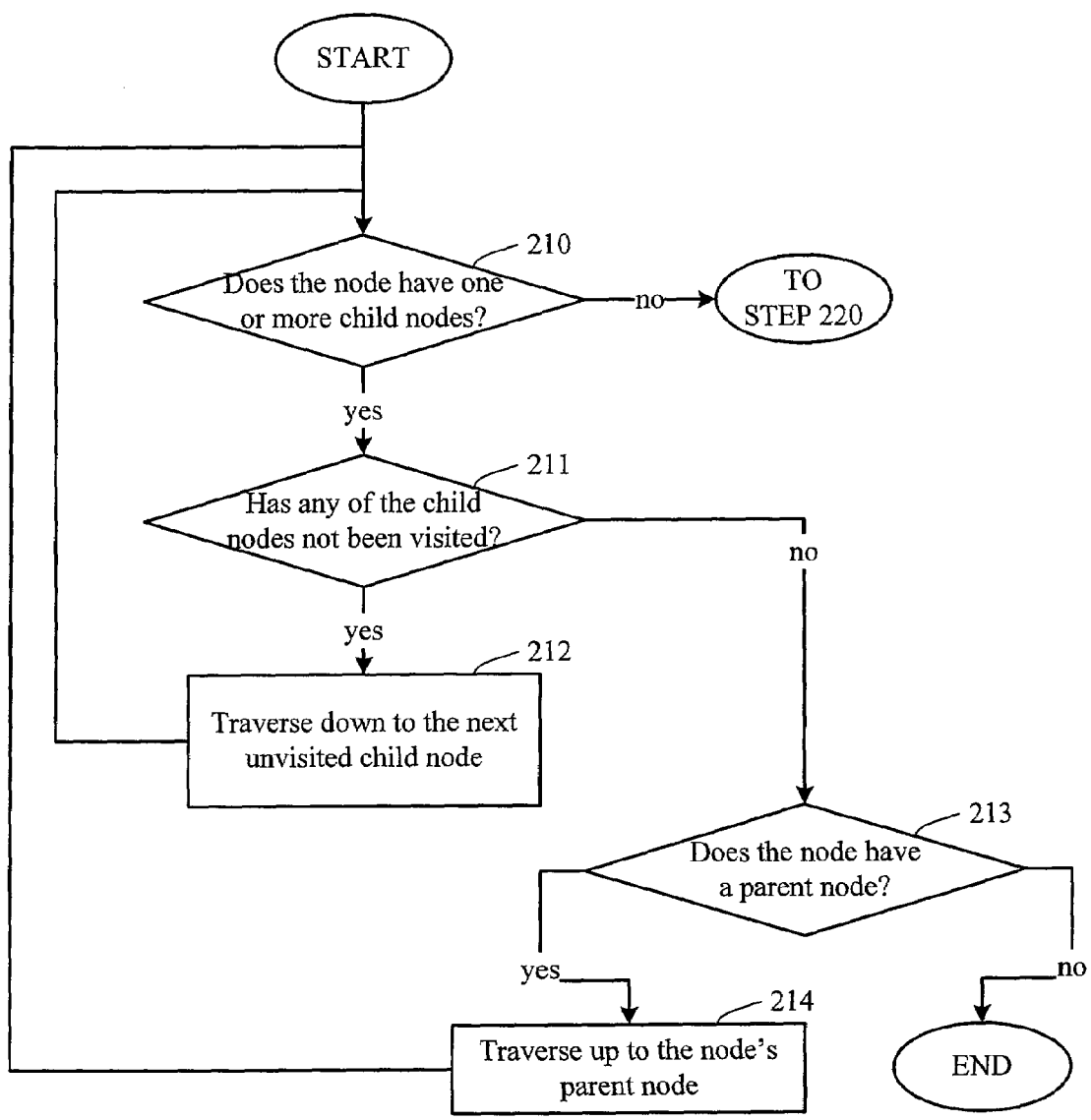
FIGS. 2A-2B illustrate a method that employs a depth-first recursive algorithm to reformat a data set organized in a multi-level nested structure into a table.
Figure 2B:
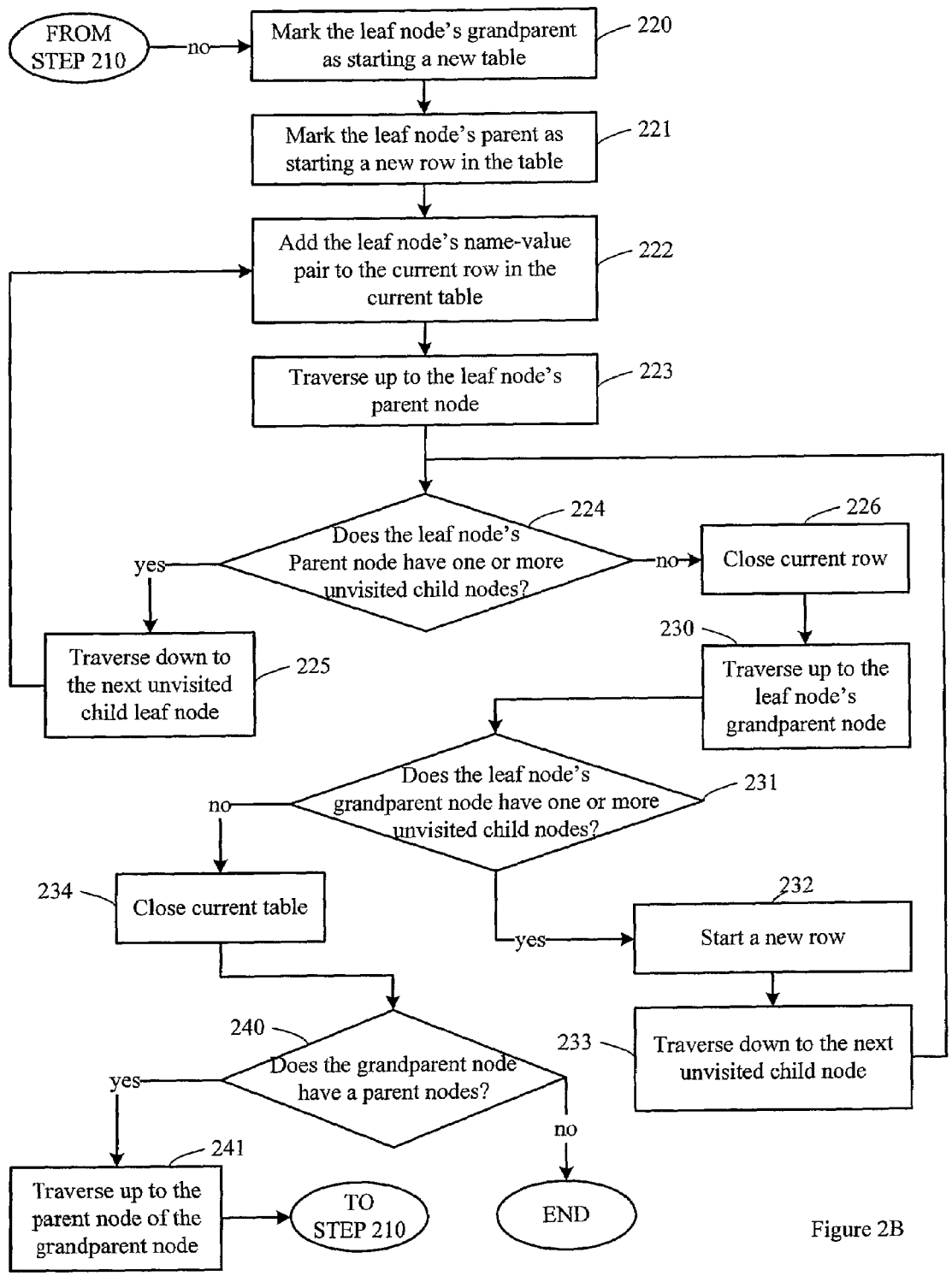

FIGS. 2A-2B illustrate a method that automatically and intelligently reformats a data set represented in any format that complies with the XML or JSON syntax specification into a table without relying on any particular syntax schema. The method is explained with the help of the sample data set shown in Sample Code 1 and Sample Code 2. Furthermore, various terms are used to distinguish different types of nodes to help simplify the explanation. Specifically, a "field" refers to a leaf node (i.e., a name-value pair), and consequently, a field has a name and a value. An "object" refers to a parent node of one or more field (i.e., leaf) nodes. A "list" refers to a grandparent node of one or more field (i.e., leaf) nodes (i.e., a parent node of one or more object nodes). The method takes as input a data set represented using XML or JSON and outputs a table, such that the table corresponds to a list from the data set, the rows of the table correspond to the objects nested within the list, and the entries of the rows of the table correspond to the fields nested within the objects.

As the parser parses through the input data, a node is encountered. With XML format, a node may be indicated by a pair of tags. In the above Sample Code 1, the first tag to be encountered is "<ysearchresponse>", and since this is the first tag, it is the root node (i.e., having no parent node). With JSON, a node may be indicated by a name string positioned on the left of a ":". In Sample Code 2, the first name string to be encountered is "ysearchresponse". In FIG. 1, the "ysearchresponse" tag or name string is represented by node 110.

A determination is made as to whether the current node (i.e., node 110) has any child nodes (step 210). With XML format, if a tag has one or more tags nested within itself, the tag has one or more child nodes. In Sample Code 1, the next tag to be encountered is "". This indicates that the current tag "<ysearchresponse>" has at least one additional tag nested within itself, and thus, the tag "<ysearchresponse>" has at least one child node. With JSON format, if the value corresponding to the name string positioned on the right of the ":" is not a string, then the name string has one or more child nodes. In Sample Code 2, on the right side of the ":" corresponding to the current name string "ysearchresponse" is another object starting with a "{", not a string, and thus, the name string "ysearchresponse" has at least one child node.

If the current node has one or more child nodes (step 210), then the current node is not a leaf node. The depth-first parser continues traversing down the current branch. A determination is made as to whether any of the child nodes of the current node has not been visited (step 211). If one or more child nodes of the current node have not been visited, then the parser traverse down to the next unvisited child node (step 212) and repeats steps 210 and 211. By repeatedly traversing down a branch of the tree, the parser will eventually reach a leaf node.

On the other hand, if all the child nodes of the current node have been visited already (step 211), this indicates that the parser has parsed all the nodes within this particular branch of the tree. The parser needs to backtrack up a level in order to parse the next branch. Thus, a determination is made as to whether the current node has a parent node (step 213). If the current node has a parent node, then the parser traverses up one level to the current node's parent node (step 214) and repeats the same steps as before for the next branch. If the current node does not have a parent node (i.e., the current node is the root node), then the parser has reached the top level of the tree, and all the branches within the tree have been parsed since all the child nodes of the current node (i.e., the root node) have been visited. The parser stops at this point.

Referring back to step 210, if the current node does not have any child node, then the current node is a leaf node. With XML format, if a tag does not have any other tag nested within itself, then the tag is a leaf node. In other words, if a tag pair encloses a value string, then the tag is a leaf node. In Sample Code 1, the first tag that is a leaf node is the "" tag that encloses the string value "Yahoo Mail provides . . . ". With JSON format, if the value corresponding to the name string positioned on the right of the ":" is a string and not an object marked by "{" or an array marked by "[", then the name string is a leaf node, because there is no additional levels of nesting within this name string. In Sample Code 2, the first name string that is a leaf node is again "abstract", and its corresponding value string is "Yahoo Mail provides . . . ". In FIG. 1, the first "abstract" tag or name string is represented by node 141A.

A XML element or JSON name-value pair is placed in the output table based on its position within the multi-level nested structure. As explained before, a leaf node corresponds to a field, and leaf nodes under the same parent node are placed within the same row of the table. Each parent node of the leaf nodes corresponds to an object and a row of the table. Each grandparent node of the leaf nodes (i.e., the parent node of the object node) corresponds to a table. Thus, once the parser encounters a leaf node, the leaf node's grandparent node corresponds to a table and the leaf node's parent node corresponds to a row. In FIG. 1, the parent node of the "abstract" node 141A is the "result" node 130A, and the grandparent node of the "abstract" node 141A is the "resultset_web" node 120. In Sample Code 1, the element that encloses the "abstract" tag is the "result" tag (i.e., the object or parent node), and the element that encloses the "result" tag is the "resultset_web" tag (i.e., the list or grandparent node). In Sample Code 2, there is no "result" name string due to the syntax of JSON. Instead, the "resultset_web" name string has an array as its value, which is indicated by "[" and "]". The parser would have to traverse through all the outer tags or name strings in order to reach the innermost "abstract" tag or name string.

Once the parser encounters the first leaf node within a list, it marks the leaf node's grandparent node as starting a new table (step 220) and marks the leaf node's parent node as starting a new row in the table (step 221). Next, the leaf node's name-value pair is added to the current row in the current table (step 222). Since the "abstract" node 141A is the first leaf node encountered, it is added to the table as the first field in the first row as shown in Table 1.

Since the parser has reached a leaf node, it backtracks up the tree to process the next branch. The parser traverses up to the leaf node's parent node (i.e., the object node, step 223) and determines whether the object node has any additional child leaf nodes that have not been processed (step 224) in order to add all other leaf nodes under the same object node to the same row of the table. If there is any additional unvisited child leaf nodes, then the parser traverses down to the next unvisited child leaf node (step 225). In Sample Code 1, the next tag to be encountered is the "<date>" tag. This is also a leaf node because there is no additional tag nested within this tag. Similarly, in Sample Code 2, the next name string to be encountered is the "date", which has a corresponding string value of "2008/06/27" on the right side of ":". The parser again adds the "date" field to the first row after the "abstract" field (step 222).

Steps 222, 223, 224, and 225 are repeated multiple times, until all the leaf nodes under the same parent object node have been processed and added to the current row of the table. In Sample Code 1, there are five tags nested within the "<result>" tag: "", "<date>", "<size>", "<title>", and "<url>", each tag corresponding to a field in the first row of Table 1. When it is determined that the current parent node does not have any additional unvisited child node (step 224), the current row of the table is compeleted (step 226) as all the leaf nodes under the current object node have been added.

As the current branch under the object node has been traversed completely, the parser backtracks one level up to the grandparent level of the leaf node (i.e., the list node, step 230) in order to process the next branch of the object node. A determination is made as to whether the grandparent list node has any additional child nodes that have not been traversed (step 231). If so, the parser starts a new row in the table (step 232) and traverses down to the next unvisited child object node (step 233) to process all the leaf nodes under this next object node. Steps 224, 225, 222, and 223 are repeated as before until all the leaf nodes under the current object node have been processed and added to the current row of the table. Thereafter, the parser proceeds to the next unvisited object node. In Sample Code 1, there are five "<result>" tags (i.e., the object nodes) nested under the "" tag (i.e., list node), and each "<result>" tags corresponds to a row in Table 1. In Sample Code 2, there are five elements in the array corresponding to the name string "resultset_web".

When all the object nodes under a list node have been processed (i.e., all the child nodes of a grandparent node have been visited and traversed, step 231), the current table is completed (step 234). A determination is made as whether the list node (i.e., the grandparent node) has a parent node (step 240). If so, the parser traverses up to the parent node of the grandparent node (i.e., the great grandparent node, step 241) in order to process the next branch of the list node, which corresponds to a new table as each list node corresponds to a different table. The same steps described above starting from step 210 repeat for the next list node, if one has not been processed.

In Sample Code 1 and Sample Code 2, the root node "ysearchresponse" only has one child list node "resultset_web", and thus, only one table (i.e., Table 1) is obtained from parsing through the input data stream. If the input data stream contains more than one list nodes, then each list node will result in a separate table, and the same recursive algorithm as illustrated in FIGS. 2A-2B may be repeated for each list node.

According to one embodiment, only one table corresponding to one list node is selected as the output table for a given XML or JSON data stream. If an input data stream only contains one list node, then the table corresponding to that list node is selected as the output table. However, if an input stream contains multiple list nodes, then the table corresponding to the list node that has the largest data size in bytes nested within it is selected as the output table. For example, if in Sample Code 1, the "<ysearchresponse>" tag has two or more "" tags nested within it, then each of the "" tags will result in a separate table. The table corresponding to the "" tag that has the largest bytes of data nested within it will be chosen as the output table. The parser keeps track of the number of bytes of data nested within each of the "" tags as it traverses through the input data stream. When the parser completes parsing the entire input data stream, the table corresponding to the "" tag that has the largest bytes of data is selected.

The method shown in FIGS. 2A-2B only adds the foundational elements or name-value pairs (i.e., leaf nodes) into the resulting table, thus removing any unnecessary and unimportant data. For example, any XML element or JSON name-value pair that has another list nested within it is ignored. Similarly, metadata, format data (e.g., color, fonts, style, etc.), comments, etc. are also discarded. As a result, the output table is much cleaner than the original input data stream and easier to process. Furthermore, because the parser algorithm determines the table entries based on the structure of the tree and places a leaf node (i.e., an element or a name-value pair) in the appropriate row of the table based on the position of the leaf node within the tree structure, the algorithm is independent of any syntax or schema. The algorithm may be applied to a data stream expressed in any format that meets either XML or JSON syntax specification, including any format that extends XML, such as RSS, XHTML, Atom, etc., or any format that may be conceptually represented using a hierarchical tree structure (i.e., a multi-level nested structure). In other words, the parser does not require the syntax schema of the input data stream in order to reformat the data stream.

It is not necessary for all the object nodes to contain the same field nodes or the same number of field nodes. One object node may have one set of field nodes and another object node may have another set of field nodes. Each set of field nodes are added to the row that corresponds to their parent object node.

III. Combine Multiple Tables

Sometimes it is desirable to combine multiple sets of data obtained from different sources into a single set of data for further processing. For example, it may be beneficial to obtain information on a particular subject matter from different resources (e.g., the Internet, government and academic databases, news agencies, commercial institutes, etc.) and then combine them into a single and more comprehensive set of data for further analysis and/or processing. If necessary, data sets obtained from different sources may be reformatted into a standardized table format using the method illustrated in FIGS. 2A-2B. As a result, each set of data may be represented using a table similar to Table 1.

Once each of the available data sets is reformatted into the standardized table format, the tables may be joined together to obtain a single output table, which contains a collection of fields selected from all the input tables. The following Table 2 and Table 3 represent two sample sets of data, each obtained from a different source and having been reformatted into the standardized table format. Both sets of data relate to the subject matter "the Swan Lake ballet". One set of data (i.e., Table 2) contains video clips posted on YouTube™ relating to the ballet, and the other set of data (i.e., Table 3) contains various types of information relating to the ballet. The joining of multiple tables will be explained using Table 2 and Table 3 as sample input tables. The same process may be used to join any number of tables, and there is no limitation on the number of tables that may be joined together. Similarly, there is no limitation on the size of an input table (i.e., the number of rows and the number of fields in each row).

TABLE 2

| Video Clips of the Swan Lake Ballet |
|---|
| title="ballet - swan lake"; length=1:12; date=2008/04/06; posted_by="Mike28"; tags="ballet dance swan lake"; url=http://youtube.com/watch?v=mGWAzfGBbXI |
| title="Tchaikovsky Swan Lake Ballet"; length=2:02; date=2008/03/02; posted_by="darkman7717"; tags="Tchaikovsky swan lake cygnes Allegro moderato Barenboim Staatsoper"; url=http://youtube.com/watch?v=WmgfOXr-rZw |
| title="Swan Lake Odette Variation"; length=2:42; date=2007/02/07; posted_by="mydiorella"; tags="Svetlana Zakharova Ballet Swan Lake"; url=http://youtube.com/watch?v=Q8nSUBcYk5w |
| title="Pas de Trois from Swan Lake"; length=9:12; date=2007/09/04; posted_by="radostsguy"; tags="Swan Lake Ballet American Tchaikovsky"; url=http://youtube.com/watch?v=9HlUPVTT9jA |

TABLE 3

Information on the Swan Lake Ballet title="The History of the Ballet Swan Lake";
abstract="Complete historical information on the ...";
url=http://www.balletmet.org/Notes/SwanHist.html
title="Ballet West's 'Swan Lake' soars"; abstract="Deseret Morning News ..."; publish_date=2006/04/17; author=Scott Iwasaki;
url=http://deseretnews.com/dn/view/0,1249,635200412,00.html
title="American Ballet Theatre's Strong 'Swan Lake'";
abstract="For American Ballet Theatre's ...";
publish_date=2008/05/29; author=Joel Lobenthal;
url=http://www.nysun.com/arts/american-ballet-theatres-strong-swan-lake/78801/

There are various ways to join multiple tables, among which are cross join, inner join, and left outer join. Each of these joining methods is described separately below in more detail.

III-1. Cross Join

A cross join of two input tables results an output table where each row of the first input table is combined with each row of the second input table. The number of rows in the output table is the product of the number of rows in the two input tables. Thus, if the first input table has m rows, and the second input table has n rows, then the result output table has m×n rows. The same logic applies to joining three or more tables.

Applying cross join to Table 2 and Table 3, the output table will have 12 rows, and is shown below in Table 4.

TABLE 4

Cross Join of Table 2 and Table 3 table2$title="ballet - swan lake"; length=1:12;
date=2008/04/06; posted_by="Mike28"; tags="ballet dance swan lake";
table2$url=http://youtube.com/watch?v=mGWAzfGBbXI;
table3$title="The History of the Ballet Swan Lake";
abstract="Complete historical information on the ...";
table3$url=http://www.balletmet.org/Notes/SwanHist.html
table2$title="ballet - swan lake"; length=1:12;
date=2008/04/06; posted_by="Mike28"; tags="ballet dance swan lake";
table2$url=http://youtube.com/watch?v=mGWAzfGBbXI;
table3$title="Ballet West's 'Swan Lake' soars";
abstract="Deseret Morning News ...";
publish_date=2006/04/17; author=Scott Iwasaki;
table3$url=http://deseretnews.com/dn/view/0,1249,635200412,00.html
table2$title="ballet - swan lake"; length=1:12;
date=2008/04/06; posted_by="Mike28"; tags="ballet dance swan lake";
table2$url=http://youtube.com/watch?v=mGWAzfGBbXI;
table3$title="American Ballet Theatre's Strong 'Swan Lake'"; abstract="For American Ballet Theatre's ...";
publish_date=2008/05/29; author=Joel Lobenthal;
table3$url=http://www.nysun.com/arts/american-ballet-theatres-strong-swan-lake/78801/
table2$title="Tchaikovsky Swan Lake Ballet"; length=2:02;
date=2008/03/02; posted_by="darkman7717";
tags="Tchaikovsky swan lake cygnes Allegro moderato Barenboim Staatsoper";
table2$url=http://youtube.com/watch?v=WmgfOXr-rZw;
table3$title="The History of the Ballet Swan Lake";
abstract="Complete historical information on the ...";
table3$url=http://www.balletmet.org/Notes/SwanHist.html
$title="Tchaikovsky Swan Lake Ballet"; length=2:02;
date=2008/03/02; posted_by="darkman7717";
tags="Tchaikovsky swan lake cygnes Allegro moderato Barenboim Staatsoper";
table2$url=http://youtube.com/watch?v=WmgfOXr-rZw;
table3$title="Ballet West's 'Swan Lake' soars";
abstract="Deseret Morning News ...";

TABLE 4-continued

Cross Join of Table 2 and Table 3 publish_date=2006/04/17; author=Scott Iwasaki;
table3$url=http://deseretnews.com/dn/view/0,1249,635200412,00.html
$title="Tchaikovsky Swan Lake Ballet"; length=2:02;
date=2008/03/02; posted_by="darkman7717";
tags="Tchaikovsky swan lake cygnes Allegro moderato Barenboim Staatsoper";
table2$url=http://youtube.com/watch?v=WmgfOXr-rZw;
table3$title="American Ballet Theatre's Strong 'Swan Lake'"; abstract="For American Ballet Theatre's ...";
publish_date=2008/05/29; author=Joel Lobenthal;
table3$url=http://www.nysun.com/arts/american-ballet-theatres-strong-swan-lake/78801/
table2$title="Swan Lake Odette Variation"; length=2:42;
date=2007/02/07; posted_by="mydiorella"; tags="Svetlana Zakharova Ballet Swan Lake";
table2$url=http://youtube.com/watch?v=Q8nSUBcYk5w;
table3$title="The History of the Ballet Swan Lake";
abstract="Complete historical information on the ...";
table3$url=http://www.balletmet.org/Notes/SwanHist.html
table2$title="Swan Lake Odette Variation"; length=2:42;
date=2007/02/07; posted_by="mydiorella"; tags="Svetlana Zakharova Ballet Swan Lake";
table2$url=http://youtube.com/watch?v=Q8nSUBcYk5w;
table3$title="Ballet West's 'Swan Lake' soars";
abstract="Deseret Morning News ...";
publish_date=2006/04/17; author=Scott Iwasaki;
table3$url=http://deseretnews.com/dn/view/0,1249,635200412,00.html
table2$title="Swan Lake Odette Variation"; length=2:42;
date=2007/02/07; posted_by="mydiorella"; tags="Svetlana Zakharova Ballet Swan Lake";
table2$url=http://youtube.com/watch?v=Q8nSUBcYk5w;
table3$title="American Ballet Theatre's Strong 'Swan Lake'"; abstract="For American Ballet Theatre's ...";
publish_date=2008/05/29; author=Joel Lobenthal;
table3$url=http://www.nysun.com/arts/american-ballet-theatres-strong-swan-lake/78801/
table2$title="Pas de Trois from Swan Lake"; length=9:12;
date=2007/09/04; posted_by="radostsguy"; tags="Swan Lake Ballet American Tchaikovsky";
table2$url=http://youtube.com/watch?v=9HlUPVTT9jA;
table3$title="The History of the Ballet Swan Lake";
abstract="Complete historical information on the ...";
table3$url=http://www.balletmet.org/Notes/SwanHist.html
table2$title="Pas de Trois from Swan Lake"; length=9:12;
date=2007/09/04; posted_by="radostsguy"; tags="Swan Lake Ballet American Tchaikovsky";
table2$url=http://youtube.com/watch?v=9HlUPVTT9jA;
table3$title="Ballet West's 'Swan Lake' soars";
abstract="Deseret Morning News ...";
publish_date=2006/04/17; author=Scott Iwasaki;
table3$url=http://deseretnews.com/dn/view/0,1249,635200412,00.html
table2$title="Pas de Trois from Swan Lake"; length=9:12;
date=2007/09/04; posted_by="radostsguy"; tags="Swan Lake Ballet American Tchaikovsky";
table2$url=http://youtube.com/watch?v=9HlUPVTT9jA;
table3$title="American Ballet Theatre's Strong 'Swan Lake'"; abstract="For American Ballet Theatre's ...";
publish_date=2008/05/29; author=Joel Lobenthal;
table3$url=http://www.nysun.com/arts/american-ballet-theatres-strong-swan-lake/78801/

The fields in each row of output Table 4 are combinations of the fields in corresponding rows of input Table 2 and Table 3. Sometimes, the same field name may appear in both input tables, although the filed values may differ. For example, the rows in Table 2 and Table 3 both contain a "title" field and a "url" field. When the fields from the two tables are joined together, to avoid field conflict, according to one embodiment, duplicate field names are further qualified by their respective original table names automatically. This is often referred to as "inferred namespace". The qualifier (i.e., the table name) is automatically added to those fields that need further qualification (e.g., duplicate field names from the input tables) but is not added to those fields that do not require further qualification (e.g., unique field names from the input tables). Thus, the "title" field from Table 2 is further qualified as "table2$title" in Table 4, and the "title" field from Table 3 is further qualified as "table3$title" in Table 4. Similar namespace scheme is applied to the "url" field. On the other hand, because the "abstract" field from Table 3 is a unique name (i.e., not found in Table 2), the "abstract" field does not require further qualification.

Cross join operation performed on two input tables may be expressed using the following pseudo-code:

```
for (each row i in input table 1) {
    for (each row j in input table 2) {
        output table row k = row i + row j;
        if (a field in row i has the same name as a field in
        row j) {
            qualify the field from row i with input table 1
            namespace;
            qualify the field from row j with input table 2
            namespace;
        }
        j++;
        k++;
    }
    i++;
}
```

III-2. Inner Join

An inner join of two input tables results an output table where a row from the first input table and a row from the second input table are combined to form a row in the output table only if the two rows from the two input table satisfy a set of criteria, which is also referred to as a join predicate. According to one embodiment, the join predicate may be expressed as a function that represent one or more conditions. It is possible that none of the pair of rows from the two input tables satisfy a particular join predicate, in which case the output table would be empty (i.e., has no rows).

Suppose a join predicate is defined as only selecting those rows from the two input tables that have a date of the current year (i.e., year 2008) so that only the more recent records are selected for the output table. Applying this predicate to Table 2 and Table 3, the first two rows of Table 2 satisfy this condition and the third row of Table 3 satisfies this condition. The resulting table is shown below in Table 5.

TABLE 5

Inner Join of Table 2 and Table 3 table2$title="ballet - swan lake"; length=1:12;
date=2008/04/06; posted_by="Mike28"; tags="ballet dance
swan lake";
table2$url=http://youtube.com/watch?v=mGWAzfGBbXI;
table3$title="American Ballet Theatre's Strong 'Swan
Lake'"; abstract="For American Ballet Theatre's ...";
publish_date=2008/05/29; author=Joel Lobenthal;
table3$url=http://www.nysun.com/arts/american-ballet-
theatres-strong-swan-lake/78801/
$title="Tchaikovsky Swan Lake Ballet"; length=2:02;
date=2008/03/02; posted_by="darkman7717";
tags="Tchaikovsky swan lake cygnes Allegro moderato
Barenboim Staatsoper";
table2$url=http://youtube.com/watch?v=WmgfOxr-rZw;
table3$title="American Ballet Theatre's Strong 'Swan
Lake'"; abstract="For American Ballet Theatre's ...";
publish_date=2008/05/29; author=Joel Lobenthal;
table3$url=http://www.nysun.com/arts/american-ballet-
theatres-strong-swan-lake/78801/

Note that although in Table 2, the date field name is "date" and in Table 3, the date field name is "publish_date", the algorithm is able to recognize that both fields relate to date information because the keyword "date" is in the two field names.

Inner join operation performed on two input tables may be expressed using the following pseudo-code:

```
for (each row i in input table 1) {
    for (each row j in input table 2) {
        if (row i and row j satisfy predicate function) {
            output table row k = row i + row j;
            if (a field in row i has the same name as a
            field in row j) {
                qualify the field from row i with input
                table 1 namespace;
                qualify the field from row j with input
                table 2 namespace;
            }
            k++;
        }
        j++;
    }
    i++;
}
```

III-3. Left Outer Join

A left outer join of two input tables results an output table where all the rows from the first table (i.e., the left table) are added to the output table regardless of whether these rows satisfy a join predicate but only those rows from the second table that satisfy the join predicate are selected for the output table. Using the same "date" predicate as above, performing a left outer join on Table 2 and Table 3 would result the following Table 6.

TABLE 6

Cross Join of Table 2 and Table 3 table2$title="ballet - swan lake"; length=1:12;
date=2008/04/06; posted_by="Mike28"; tags="ballet dance
swan lake";
table2$url=http://youtube.com/watch?v=mGWAzfGBbXI;
table3$title="American Ballet Theatre's Strong 'Swan
Lake'"; abstract="For American Ballet Theatre's ...";
publish_date=2008/05/29; author=Joel Lobenthal;
table3$url=http://www.nysun.com/arts/american-ballet-
theatres-strong-swan-lake/78801/
$title="Tchaikovsky Swan Lake Ballet"; length=2:02;
date=2008/03/02; posted_by="darkman7717";
tags="Tchaikovsky swan lake cygnes Allegro moderato
Barenboim Staatsoper";
table2$url=http://youtube.com/watch?v=WmgfOxr-rZw;
table3$title="American Ballet Theatre's Strong 'Swan
Lake'"; abstract="For American Ballet Theatre's ...";
publish_date=2008/05/29; author=Joel Lobenthal;
table3$url=http://www.nysun.com/arts/american-ballet-
theatres-strong-swan-lake/78801/
table2$title="Swan Lake Odette Variation"; length=2:42;
date=2007/02/07; posted_by="mydiorella"; tags="Svetlana
Zakharova Ballet Swan Lake";
table2$url=http://youtube.com/watch?v=Q8nSUBcYk5w;
table3$title="American Ballet Theatre's Strong 'Swan
Lake'"; abstract="For American Ballet Theatre's ...";
publish_date=2008/05/29; author=Joel Lobenthal;
table3$url=http://www.nysun.com/arts/american-ballet-
theatres-strong-swan-lake/78801/
table2$title="Pas de Trois from Swan Lake"; length=9:12;
date=2007/09/04; posted_by="radostsguy"; tags="Swan Lake
Ballet American Tchaikovsky";
table2$url=http://youtube.com/watch?v=9HlUPVTT9jA;
table3$title="American Ballet Theatre's Strong 'Swan
Lake'"; abstract="For American Ballet Theatre's ...";

TABLE 6-continued

Cross Join of Table 2 and Table 3 publish_date=2008/05/29; author=Joel Lobenthal;
table3$url=http://www.nysun.com/arts/american-ballet-
theatres-strong-swan-lake/78801/

Although the third and fourth row from input Table 2 do not satisfy the join predicate (i.e., do not have a date within the year 2008), these rows are nevertheless combined with the third row from Table 3 and added to output Table 6 because these rows are from the first input table (i.e., the left input table). Only the third row from input Table 3 satisfies the join predicate, and thus, only this row is selected for output Table 6. Consequently, the four rows in Table 6 result from combining the fields from the four rows from Table 2 and the third row from Table 3 respectively.

Left outer join operation performed on two input tables may be expressed using the following pseudo-code:

```
for (each row i in input table 1) {
    for (each row j in input table 2) {
        if (row j satisfies predicate function) {
            output table row k = row i + row j;
            if (a field in row i has the same name as a
            field in row j) {
                qualify the field from row i with input
                table 1 namespace;
                qualify the field from row j with input
                table 2 namespace;
            }
            k++;
        }
        j++;
    }
    if (none of the rows in table 2 satisfies predicate
    function) {
        output table row k = row i;
        k++;
    }
    i++;
}
```

IV. Group Selected Rows in a Table

In order to simplify the discussion, the sample tables shown above only contain a small number of rows. In practice, however, a set of data often results in a table having hundreds, thousands, or more rows. Sometimes, selected rows from a table may have similar or related fields, and it may be desirable to group these rows for one reason or another (e.g., to reduce the complexity of data processing or analysis). According to one embodiment, rows of a table may be grouped together based on another set of criteria, which may be referred to as a group predicate and may be expressed as a predicate function. Any condition may be used to select and group rows. For example, rows may be grouped based on dates, keywords, field names and/or values, sizes, etc. Furthermore, the selected rows that satisfy the grouping condition(s) may be grouped together in any way desirable. For example, the fields may be combined, the field values may be added together or averaged, etc.

Table 4, which is the cross join result of Table 2 and Table 3, has twelve rows and some of the field values in selected rows overlap with each other. A group predicate may be specified to select all the rows that contain a particular field (e.g., the "author" field) and group them together. Those rows that do not contain the specified field are left unmodified. There are eight rows in Table 4 that contain the "author" field and therefore are grouped together into a single row. The other four rows do not contain the "author" field and are left unmodified. The following Table 7 shows the result of the group operation performed on Table 4.

TABLE 7

Group Selected Rows of Table 4 table2$title="ballet - swan lake"; length=1:12;
date=2008/04/06; posted_by="Mike28"; tags="ballet dance
swan lake";
table2$url=http://youtube.com/watch?v=mGWAzfGBbXI;
table3$title="The History of the Ballet Swan Lake";
abstract="Complete historical information on the ...";
table3$url=http://www.balletmet.org/Notes/SwanHist.html
table2$title="Tchaikovsky Swan Lake Ballet"; length=2:02;
date=2008/03/02; posted_by="darkman7717";
tags="Tchaikovsky swan lake cygnes Allegro moderato
Barenboim Staatsoper";
table2$url=http://youtube.com/watch?v=WmgfOXr-rZw;
table3$title="The History of the Ballet Swan Lake";
abstract="Complete historical information on the ...";
table3$url=http://www.balletmet.org/Notes/SwanHist.html
table2$title="Swan Lake Odette Variation"; length=2:42;
date=2007/02/07; posted_by="mydiorella"; tags="Svetlana
Zakharova Ballet Swan Lake";
table2$url=http://youtube.com/watch?v=Q8nSUBcYk5w;
table3$title="The History of the Ballet Swan Lake";
abstract="Complete historical information on the ...";
table3$url=http://www.balletmet.org/Notes/SwanHist.html
table2$title="Pas de Trois from Swan Lake"; length=9:12;
date=2007/09/04; posted_by="radostsguy"; tags="Swan Lake
Ballet American Tchaikovsky";
table2$url=http://youtube.com/watch?v=9HlUPVTT9jA;
table3$title="The History of the Ballet Swan Lake";
abstract="Complete historical information on the ...";
table3$url=http://www.balletmet.org/Notes/SwanHist.html
table2$title="ballet - swan lake"; length=1:12;
date=2008/04/06; posted_by="Mike28"; tags="ballet dance
swan lake";
table2$url=http://youtube.com/watch?v=mGWAzfGBbXI;
table3$title="American Ballet Theatre's Strong 'Swan
Lake'"; abstract="For American Ballet Theatre's ...";
publish_date=2008/05/29; author=Joel Lobenthal;
table3$url=http://www.nysun.com/arts/american-ballet-
theatres-strong-swan-lake/78801/

Once the eight rows that satisfy the group predicate (i.e., having the "author" field) are combined together, there are duplicate fields. According to various embodiments, a set of criteria may be specified to indicate how the fields from the selected rows should be combined. For example, completely duplicate fields (e.g., fields that have exactly the same name and value) may be discarded. Fields having the same name but different values may have their values added together, averaged, taken the maximum or minimum value, etc. In Table 7, the row resulted from grouping the eight rows that satisfy the group predicate (i.e., the last row) have the most recent record for each set of fields (the set of fields having the most recent dates).

Row grouping operation performed on a table may be expressed using the following pseudo-code:

```
for (each row i in input table ) {
    if (row i satisfies predicate function) {
        select row i for grouping;
    else {
        output table row j = row i;
        j++;
    }
    i++;
}
for (those rows selected for grouping) {
```

```
        combine fields from the selected rows according to a set
        of rules;
    }
    output table row j = combined row;
```

V. Rank Rows of a Table and other Table Operations

Row ranking or sorting is another operation often performed on a table. The rows of a table may be ranked according to any criteria. For example, the rows may be ranked according to the name or value of a particular field, according to values of multiple fields, in increasing value, in decreasing value, etc.

In addition, other operations that may be performed on a table include, for example, adding a field to all the rows in a table or to only those rows in a table that satisfy a set of criteria, subtracting a field to all or selected rows of a table, deleting those rows that satisfy a set of criteria from a table, etc.

VI. Table Presentation

Once a particular table has been processed and a satisfactory result has been achieved, the set of data represented by the table may be presented to a user. Since a table, such as the ones shown above, is obtained originally by traversing a multi-level nested data structure, such that each row corresponds to an object located at one level outside the innermost level and each field corresponds to a name-value at the innermost level, by reversing the process, a table may be converted back to a multi-level nested data structure such as XML or JSON.

To help simplify the process, one or more templates that satisfy either XML or JSON syntax requirement may be provided. Once the fields in a table are made to correspond to selected entries in a template, the table may be converted back to XML or JSON format using the template. The following is a template of four levels of nested data structure that complies with XML syntax.

```
<level 1>
    <level 2>
        <level 3>
            <level 4A>
            </level 4A>
            <level 4B>
            </level 4B>
            <level 4C>
            </level 4C>
            ...
        </level 3>
    </level 2>
</level 1>
```

Since level 4 is the innermost level, they correspond to the fields in each row of a table. Level 3 then corresponds to a row in the table, and level 2 corresponds to the table itself. Applying this template to Table 5, one may specify that tag "level 4A" equals field "table2$title", tag "level 4B" equals field "abstract", tag "level 4C" equals field "table3$url", and tag "level 4D" equals field "table2$url". Table 5 has two rows, and thus, tag "level 3" is repeated twice. Table 5 may be converted into the following XML code to be presented to the users.

```
<level 1>
    <level 2>
        <level 3>
            <title>ballet - swan lake</title>
            <abstract>For American Ballet Theatre's
            ...</abstract>
            <url>http://www.nysun.com/arts/american-ballet-
            theatres-strong-swan-lake/78801/</url>
            <url>http://youtube.com/watch?v=mGWAzfGBbXI
            </url>
        </level 3>
        <level 3>
            <title>Tchaikovsky Swan Lake Ballet</title>
            <abstract>For American Ballet Theatre's
            ...</abstract>
            <url>http://www.nysun.com/arts/american-ballet-
            theatres-strong-swan-lake/78801/</url>
            <url> http://youtube.com/watch?v=WmgfOXr-
            rZw</url>
        </level 3>
    </level 2>
</level 1>
```

VII. Application Programming Interface (API)

The above functionalities (i.e., data reformatting, table operations, and table presentation) may be implemented as computer software programs and combined into an API for ease of use. A function for reformatting an input data stream may have the interface "Table create (string table_name, pointer input_data)". This function takes as input a table name and a pointer to the input data stream to be reformatted and returns a table. It is not necessary to specify any parsing logic or schema as the parser automatically determines the appropriate entry in the output table for each name-value pair found in the input data stream based on the position of the name-value pair within the multi-level nested data structure.

A function that performs the join operation on two tables may have the interface "Table join (Definition join_predicate, Table table 1, Table table 2)". This function takes as input a join predicate and two input tables and returns a result joined table. It is not necessary to specify any namespace qualification since the join function automatically and intelligently resolve any name conflict. If, as a result of joining two rows from the two input tables, there are two fields having the same name, then these two fields are automatically further qualified with their respective original table name. As a result the "join" function is commutative, such that it is not necessary to specify the join constraints for each input table, but only a join predicate for the input tables. Note that the same join algorithm may be used to join three or more tables.

A function that performs the group operation on selected rows of a table may have the interface "Table group (Definition group_predicate, Definition group_method, Table table)". This function takes as input a group predicate that specifies what condition(s) need to be satisfied for selecting rows to be grouped together, a group method that specifies how to group the fields from the selected rows, and a table and returns a result joined table. Again, it is not necessary to specify any namespace qualification. For example, if a request is made to join any rows that include a particular field and if the specified field has been further qualified by a namespace, when parsing the rows to determine if a particular row satisfies the group predicate, the namespace of the field is automatically ignored.

In addition to the table operations, the API may include support functionalities. For example, various text normalization functions may be provided, which may include converting all alphabets in a text string to all lower case or all upper case, removing extra white space or trivial words such as "a", "the", "that", "this", "which", reordering words, etc. Such functions are useful when a predicate requires an overlap (e.g., multiple keywords matching) between fields from multiple tables or multiple rows of the same table. By performing text normalization before searching for overlaps, it is no longer necessary to require an exact match. Instead, certain degree of similarity may be sufficient to satisfy an overlap predicate. As a result, the overlap algorithm incorporates some intelligent decision making process.

For example, suppose a row from one table has a "title" field whose value is "Tchaikovsky's ballet swan lake" and another row from another table has a "title" field whose value is "Swan Lake by Tchaikovsky". A join predicate requires that the rows from the two input tables are to be selected for combining only if there are at least three overlapping words found in the "title" fields. Without first performing text normalization, the above sample does not satisfy the join predicate, because strictly speaking, "swan" does not equal "Swan" and "Tchaikovsky's" does not equal "Tchaikovsky". However, applying text normalization to the two field values, the first "title" field value becomes "tchaikovsky ballet swan lake" and the second "title" field value becomes "swan lake tchaikovsky". The two values now have three overlapping words.

The API may include templates in XML or JSON code for presenting a table to a user. Different templates may have different layout or design so that an appropriate template may be easily selected for a particular type of data set.

The API may be especially beneficial in combining and processing multiple sets of data obtained from different sources. For example, suppose a person initiates a search request for the subject matter "the Swan Lake ballet" at an Internet search site. Traditional search engines would return a list of websites that has information on the Swan Lake ballet. On the other hand, a search engine incorporating the API is able to perform several searches on behalf of the person from many different sources (e.g., websites, news, blogs, video clips, images, live feeds, etc.) and combine multiple sets of search results together to present a more comprehensive search result. The search engine may also correlate related results from different sources and rank them in the order of relevance or other types of criteria. Suppose among one data set is a news story about a upcoming performance of the Swan Lake ballet by the American Ballet Theatre, and among another data set is a video clip of a past performance of the Swan Lake ballet by the American Ballet Theatre. By selecting the suitable join predicate (i.e., overlapping conditions), the search engine may determine that the news story and the video clip are closely related (e.g., by finding several matching words or phrases, such as "ballet", "Swan Lake", "American Ballet Theatre", etc.) and combine them together. The search engine may then present the two search results together to the person. As a result, the person may read the news story and then watch a video clip about the performance thereafter if he or she so desires.

The API may be incorporated into an environment where multiple sets of data expressed in different formats are collected from multiple sources and need to be combined and processed together. For example, the API is useful in connection with any arbitrary Representational State Transfer (REST) APIs. REST APIs are resource oriented and provide a collection of objections expressed using various formats. The present API may be used to reformat data collections obtained using REST APIs before performing additional operations on them. The following is a sample code segment written in Python that uses some of the API operations described above.

```
from util import console, text
from yos.yql import db
from yos.boss import ysearch
ynews_data = ysearch.search("google android", vertical="news",
count=100, more={"news.ranking": "date"})
ynews = db.create(name="ynews", data=ynews_data)
ynews.rename(before="headline", after="title")
sm = db.create(name="sm",
url="http://summize.com/search.json?q=google+android&rpp=60&lang=
en")
sm.rename(before="text", after="title")
ytf = lambda r: {"title": r["title"]["value"], "favorites":
int(r["statistics"]["favoriteCount"])}
yt = db.select(name="yt", udf=ytf,
url="http://gdata.youtube.com/feeds/api/videos?vq=google+andro
id&lr=en&order by=published")
diggf = lambda r: {"title": r["title"]["value"], "diggs":
int(r["diggCount"]["value"])} digg = db.select(name="dg",
udf=diggf,
url="http://digg.com/rss_search?search=google+android&area=dig
&type=both&sec tion=news")
def overlap_predicate(r1, r2):
    return text.overlap(r1["title"], r2["title"]) > 2
tb = db.join(overlap_predicate, [ynews, sm, digg, yt])
def socialf(row):
    row.update({"social": row["dg$diggs"] +
row["yt$favorites"]}) ; return row
tb = db.select(udf=socialf, table=tb)
tb = db.group(by=["ynews$title"], key="social", reducer=lambda
d1,d2: d1+d2, as="rank", table=tb, norm=text.norm) tb =
db.sort(key="rank", table=tb)
for r in tb.rows:
    console.write( "\n%s\n[y] %s\n[t] %s\n[sr] %d\n" %
(r["sm$created_at"], r["ynews$title"], r["sm$title"],
r["rank"]) )
```

Functionalities in the API (e.g., data reformatting, table operations, text normalization, table presentation, etc.) may be implemented as computer program product(s) having a set of computer program instructions, which is usually organized into multiple program modules. Generally, program modules include routines, programs, objects, components, data structures, and so forth, which perform particular tasks or implement particular abstract data types. The computer program instructions with which embodiments of the invention are implemented may be stored in any type of computer-readable media, and may be executed according to a variety of computing models including, for example, on a consumer electronic device, on a stand-alone computing device, or according to a distributed computing model in which various of the functionalities described herein may be effected or employed at different locations.

Figure 3:
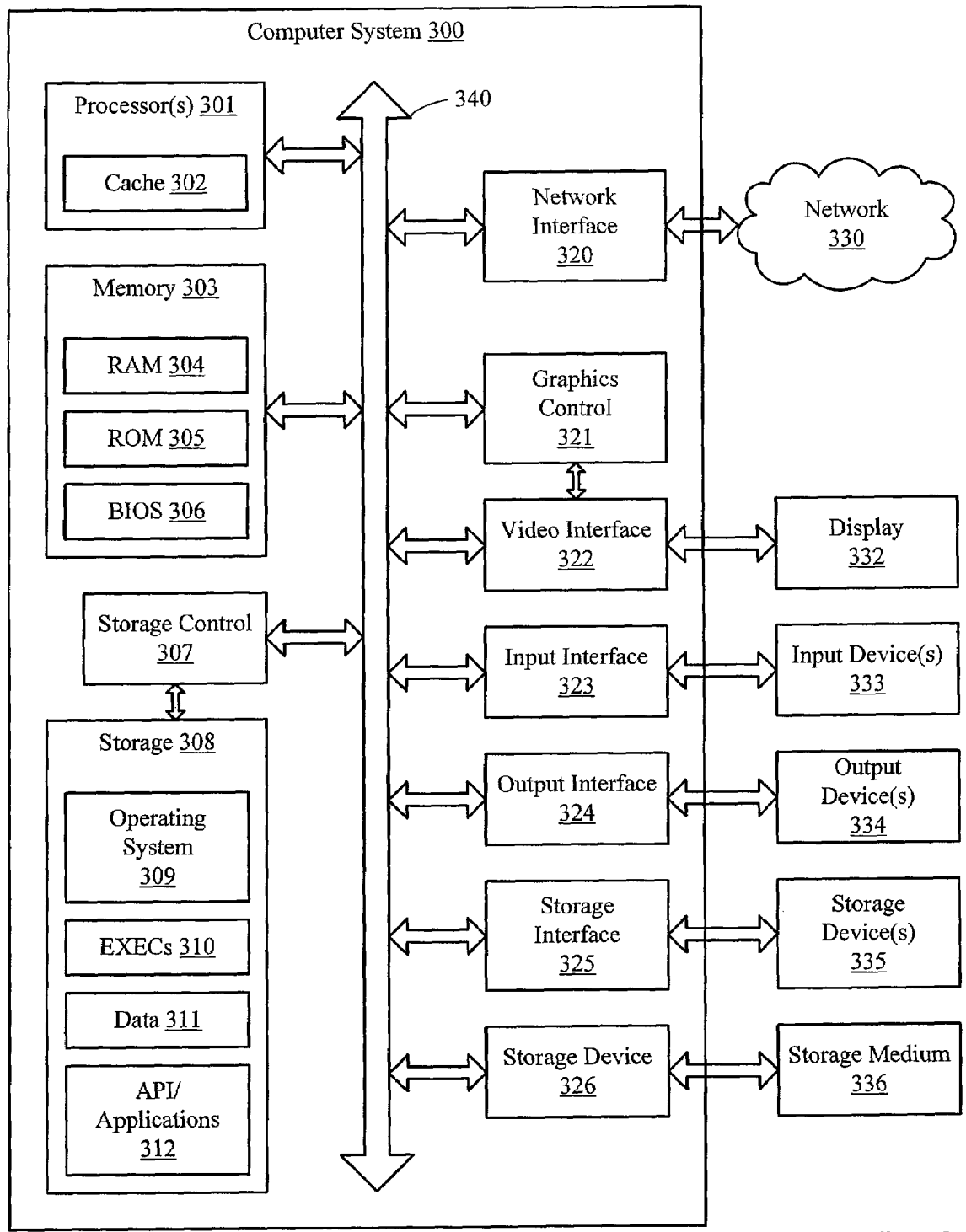
FIG. 3 illustrates a general computer system suitable for implementing embodiments of the present invention.

FIG. 3 illustrates a computer system 300 suitable for implementing embodiments of the present invention. The components shown in FIG. 3 for computer system 300 are exemplary in nature and are not intended to suggest any limitation as to the scope of use or functionality of the API. Neither should the configuration of components be interpreted as having any dependency or requirement relating to any one or combination of components illustrated in the exemplary embodiment of a computer system. The computer system 300 may have many physical forms including an integrated circuit, a printed circuit board, a small handheld device (such as a mobile telephone or PDA), a personal computer or a super computer.

Computer system 300 includes a display 332, one or more input devices 333 (e.g., keypad, keyboard, mouse, stylus, etc.), one or more output devices 334 (e.g., speaker), one or more storage devices 335, various types of storage medium 336.

The system bus 340 link a wide variety of subsystems. As understood by those skilled in the art, a "bus" refers to a plurality of digital signal lines serving a common function. The system bus 340 may be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 301 (also referred to as central processing units, or CPUs) optionally contain a cache memory unit 302 for temporary local storage of instructions, data, or computer addresses. Processor(s) 301 are coupled to storage devices including memory 303. Memory 303 includes random access memory (RAM) 304 and read-only memory (ROM) 305. As is well known in the art, ROM 305 acts to transfer data and instructions uni-directionally to the processor(s) 301, and RAM 304 is used typically to transfer data and instructions in a bi-directional manner. Both of these types of memories may include any suitable of the computer-readable media described below. A fixed storage 308 is also coupled bi-directionally to the processor(s) 301, optionally via a storage control unit 307. It provides additional data storage capacity and may also include any of the computer-readable media described below. Storage 308 may be used to store operating system 309, EXECs 310, application programs 312, data 311 and the like and is typically a secondary storage medium (such as a hard disk) that is slower than primary storage. It will be appreciated that the information retained within storage 308, may, in appropriate cases, be incorporated in standard fashion as virtual memory in memory 303.

Processor(s) 301 is also coupled to a variety of interfaces such as graphics control 321, video interface 322, input interface 323, output interface, storage interface, and these interfaces in turn are coupled to the appropriate devices. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 301 may be coupled to another computer or telecommunications network 330 using network interface 320. With such a network interface 320, it is contemplated that the CPU 301 might receive information from the network 330, or might output information to the network in the course of performing the above-described method steps. Furthermore, method embodiments of the present invention may execute solely upon CPU 301 or may execute over a network 330 such as the Internet in conjunction with a remote CPU 301 that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

The present invention has several advantageous. First, for data reformatting, the parser relies on the hierarchical nature of the input data structure, not on the actual syntax schema of the format in which the data is represented. Thus, any data set organized in a multi-level nested data structure may be reformatted readily without actually knowing the actual syntax schema of a format used by the data set.

Second, for various table operations, an inferred namespace is used to automatically resolve any potential field name conflicts. For example, when joining two or more tables, fields having the same name from different tables are automatically further qualified with their original table name. When comparing field names against a predicate function, added qualifiers are ignored. In addition, text normalization enables an operation to find similarities among multiple fields instead of requiring exact matches.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method implemented on a machine having at least one processor, storage, and communication platform, comprising:

accessing a first table corresponding to a first set of data, wherein the first set of data contains a first plurality of name-value pairs organized in a multi-level nested structure and represented using a first format with a first syntax, the first table has at least one row and each row has at least one field, and the first table corresponds to a name-value pair from the first set of data that is located at two levels outside an innermost level, each row of the first table corresponds to a name-value pair nested immediately within the name-value pair corresponding to the first table, and each field of a row corresponds to a name-value pair nested immediately within the name-value pair corresponding to the row;

accessing at least a second table corresponding to a second set of data, wherein the second set of data contains a second plurality of name-value pairs organized in a multi-level nested structure and represented using a second format with a second syntax, the second table has at least one row and each row has at least one field, and the second table corresponds to a name-value pair from the second set of data that is located at two levels outside an innermost level, each row of the second table corresponds to a name-value pair nested immediately within the name-value pair corresponding to the second table, and each field of a row corresponds to a name-value pair nested immediately within the name-value pair corresponding to the row;

joining at least the first table and the second table according to a join predicate to obtain a third table, such that a row from the first table and a row from the second table are combined to form a row in the third table if the row from the first table and the row from the second table both satisfy the join predicate; and automatically resolving any namespace conflict when joining the first table and the second table, such that if a field from a first row from the first table and a field from a second row from the second table have the same name and the first row and the second row are to be combined, then the field from the first row is automatically qualified with a name of the first table and the field from the second row is automatically qualified with a name of the second table.

2. A method as recited in 1, further comprising:
converting the first set of data into the first table; and
converting the second set of data into the second table, wherein the first set of data and the second set of data are converted into the first table and the second table respectively without relying on any schema for the first syntax and the second syntax.

3. A method as recited in 1, wherein the first table and the second table are joined without any namespace qualification.

4. A method as recited in claim 1, wherein the join predicate is expressed as a conditional function.

5. A method as recited in 1, further comprising:
grouping selected rows from the third table according to a group predicate, such that all the rows from the third table that satisfy the group predicate are grouped into a single row.

6. A method as recited in 5, further comprising:
grouping selected rows from the third table further according to a field grouping scheme, such that duplicate fields from the selected rows are replaced with a single field having a value calculated according to the field grouping scheme.

7. A method as recited in 1, further comprising:
ranking the rows from the third table according to a rank predicate.

8. A method as recited in 1, further comprising:
presenting the third table based on a template.

9. A system, comprising:
at least one storage device; and
at least one processor coupled to the at least one storage device, the at least one processor configured for performing:
(i) a reformat operation that receives as input a data set having a plurality of data elements organized in a multi-level nested data structure and returns as output a first table, wherein the first table has at least one row and each row has at least one field, the first table corresponds to a data element that is located at two levels outside an innermost level, each row of the first table corresponds to a data element nested immediately within the data element corresponding to the first table, and each field of a row corresponds to a data element nested immediately within the data element corresponding to the row; and
(ii) a join operation that receives as input a second table, a third table, and a join predicate and returns as output a fourth table, such that a row from the second table and a row from the third table are combined to form a row in the fourth table if the row from the second table and the row from the third table both satisfy the join predicate,
wherein
when performing the join operation, the at least one processor automatically resolves any namespace conflict when joining the second table and the third table, such that if a field from a first row from the second table and a field from a second row from the third table have the same name and the first row and the second row are to be combined, then the field from the first row is automatically qualified with a name of the second table and the field from the second row is automatically qualified with a name of the third table.

10. The system of claim 9, wherein the input data set is represented using a format having a predefined syntax, and the reformat operation does not rely on a schema of the predefined syntax.

11. The system of claim 9, wherein the at least one processor is further configured for performing:
a group operation that receives as input a fifth table and a group predicate and returns as output a sixth table, such that selected rows from the fifth table that satisfy the group predicate are grouped into a single row in the sixth table.

12. The system of claim 9, wherein the at least one processor is further configured for performing:
a rank operation that receives as input a seventh table and a rank condition and returns as output a eight table, such that the rows in the seventh table are ranked according to the rank condition.

13. The system of claim 9, wherein the at least one processor is further configured for performing:
a text normalization operation that receives as input a first alpha-numerical string and returns as output a second alpha-numerical string, where all the alphabets in the first alphanumerical string are converted to either lower or upper case and all the trivial words and extra white spaces in the first alpha-numerical string are discarded.

14. The system of claim 9, wherein the at least one storage device is configured for storing:
at least one template that complies with a predefined syntax for presenting a table to a user.

15. A tangible non-transitory machine-readable medium having information stored thereon, wherein the information, when read by a machine, causes the machine to perform the following:
access a first table corresponding to a first set of data, wherein the first set of data contains a first plurality of name-value pairs organized in a multi-level nested structure and represented using a first format with a first syntax, the first table has at least one row and each row has at least one field, and the first table corresponds to a name-value pair from the first set of data that is located at two levels outside an innermost level, each row of the first table corresponds to a name-value pair nested immediately within the name-value pair corresponding to the first table, and each field of a row corresponds to a name-value pair nested immediately within the name-value pair corresponding to the row;
access at least a second table corresponding to a second set of data, wherein the second set of data contains a second plurality of name-value pairs organized in a multi-level nested structure and represented using a second format with a second syntax, the second table has at least one row and each row has at least one field, and the second table corresponds to a name-value pair from the second set of data that is located at two levels outside the innermost level, each row of the second table corresponds to a name-value pair nested immediately within the name-value pair corresponding to the second table, and each field of a row corresponds to a name-value pair nested immediately within the name-value pair corresponding to the row;
join at least the first table and the second table according to a join predicate to obtain a third table, such that a row from the first table and a row from the second table are combined to form a row in the third table if the row from the first table and the row from the second table both satisfy the join predicate; and automatically resolve any namespace conflict when joining the first table and the second table, such that if a field from a first row from the first table and a field from a second row from the second table have the same name and the first row and the second row are to be combined, then the field from the first row is automatically qualified with a name of the first table and the field from the second row is automatically qualified with a name of the second table.

16. The medium of claim 15, wherein the information, when read by the machine, causes the machine to further perform the following:

convert the first set of data into the first table; and convert the second set of data into the second table, wherein the first set of data and the second set of data are converted into the first table and the second table respectively without relying on any schema for the first syntax and the second syntax.

17. The medium of claim 15, wherein the first table and the second table are joined without any namespace qualification.

* * * * *